March 2, 1943.     L. H. DE LANGEN     2,312,999
FILTER FOR SEPARATING SOLIDS FROM LIQUIDS
Filed Dec. 19, 1939
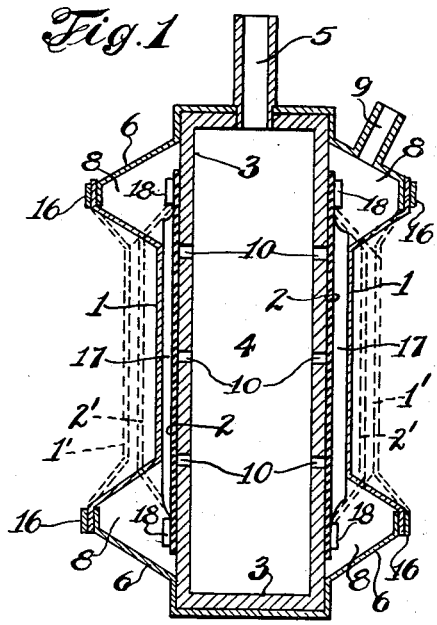
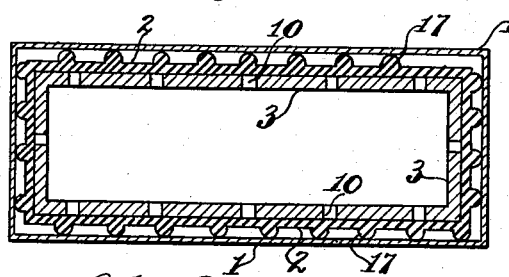
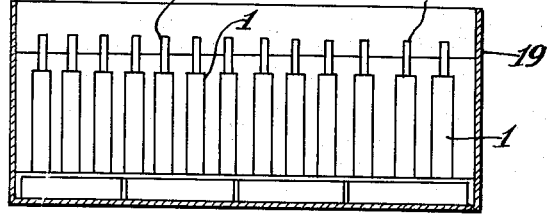
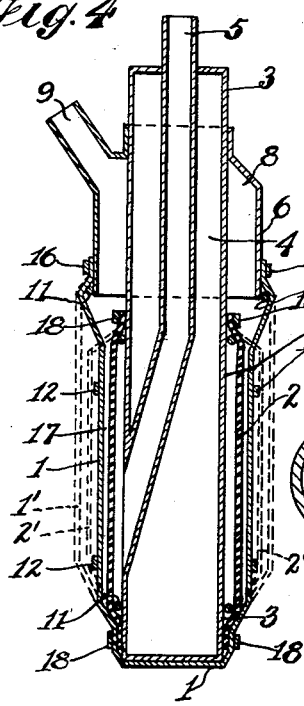
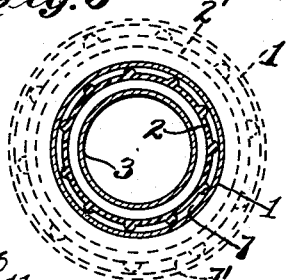
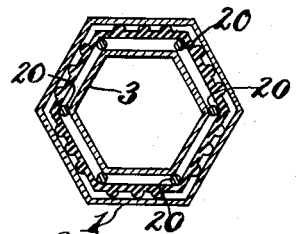
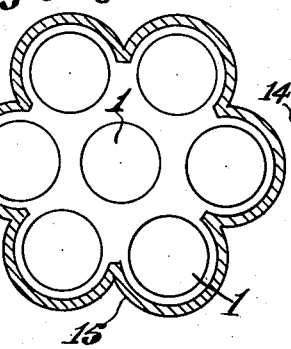
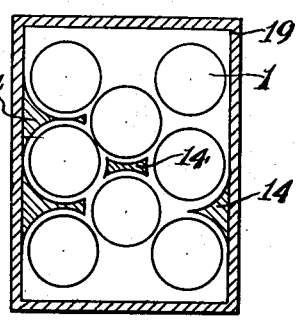
INVENTOR
Lambertus Hendrik de Langen
BY Frederick E. Hahne Patented Mar. 2, 1943

2,312,999

UNITED STATES PATENT OFFICE 2,312,999

FILTER FOR SEPARATING SOLIDS FROM LIQUIDS

Lambertus Hendrik de Langen, Haren, Netherlands; vested in the Alien Property Custodian Application December 19, 1939, Serial No. 309,936
In the Netherlands December 23, 1938

6 Claims. (Cl. 210—153)

This invention relates to a filter for separating solids from liquids or gases.

My new separator is especially suitable to filter non-grainshaped material, such as glairs, from water.

A difficulty of the known continuous drumfilters is that it is difficult to remove the filtercake and that often very large filter surfaces are essential.

My new filter has the advantage to be very simple of construction and in comparison to the dimensions and the weight to have a very large working surface. The removing of the filtered material is very simple with my new filter.

In the drawing several embodiments of my invention are shown by way of example.

Fig. 1 shows a vertical section of a very simple shape of a filter according to my invention, Fig. 2 is a horizontal section of the filter according to Fig. 1, Fig. 3 shows schematically the manner in which a number of filters according to Fig. 1 can be arranged in a tank together, Fig. 4 shows a vertical section of another embodiment with circular cross section, Fig. 5 is a horizontal cross section of the filter according to Fig. 4, Fig. 6 shows a horizontal cross section of a filter with a polygonal cross section, Fig. 7 shows in which manner a number of filters with circular cross section can be arranged in a specially-shaped tank, Fig. 8 shows diagrammatically a number of filters with circular cross section arranged in a tank with rectangular cross section.

The filter according to Fig. 1 has a filter cloth 1, that is attached with clamp bands 16 or the like to arm-plates 6. In Fig. 1 the filter is shown in the active position.

Behind the filter cloth 1 and in some distance of it a sleeve 2 provided with ribs 17 is situated. This sleeve is slipped over a tube or plate 3 defining a chamber 4. This chamber is in connection with a conduit 5 through which liquid or gas under pression can be brought into the chamber 4. Through the said conduit 5 the air or the liquid may also partly or fully be sucked away from the chamber 4.

Sleeve 2 with the ribs 17 is attached to tube or plate 3 with the aid of clamp bands 18 or the like. The sleeve consists of India rubber or similar deformable material.

Before the filter is used, compressed air or liquid is brought into the chamber 4 through conduit 5. This air or liquid can come through openings 10 behind the india rubber sleeve 12, by means of which it is expanded and takes up a position as is indicated in Fig. 1 with dotted lines 2¹.

Sleeve 2 is connected in such a manner that the tube or plate 3 that the press air or press liquid cannot escape.

After the india rubber surface 2 has been deformed, it presses against the flexible filter cloth 1 preferably consisting of flexible fabric. Between the ribs 17 and the filter cloth 1 vertical channels are formed, being in open connection with the chambers 8.

If now liquid or gas to be filtered is brought in contact with the filter, for example by bringing the filter into a room filled with that liquid or that gas or by filling a tank in which the filter is situated with that liquid or that gas, it can be filtered.

The solid particles are arrested by the filter cloth, whereas the filtered gas or the filtered liquid flows through channels between ribs 17 into the chambers 8 and is sucked away from there through the main 9.

After a cake of solid matter has been formed on the filter cloth, the filter becomes clogged. Then the overpressure in chamber 4 is reduced by conventional means for instance valves, on account of which the india rubber sleeve returns into its original not-deformed position. The filter cloth is then also relaxed, so that the cake becomes loose. In any case the permeability of the filter cloth and of the filter cake becomes much larger by relaxing; later on the filter cloth is again brought under tension.

In Fig. 3 it is diagrammatically indicated that a number of the filters as given in Fig. 1 can be put near each other into a tank 19. The suction conduits 5 could then be connected to a central main.

The flexible sleeve 2 may have grooves instead of ribs 17, whereas it is not essential that the ribs or grooves are in straight line.

In Fig. 4 a very efficient embodiment of a filter according to the invention is shown.

The frame or tube 3' has herewith, as can be seen from Fig. 5, a circular cross section. Whereas with a filter according to Fig. 1 the flexible sleeve 2 in "blown up" condition could become irregularly convex, which could be prevented by efficient stiffenings, this difficulty is not present with a filter according to Fig. 4. The main 5' for the bringing of press air or press liquid behind the india rubber sleeve 2 is in Fig. 4 longer than in Fig. 1 and said main ends in the wall of the tube 3'.

If desired the flexible sleeve may be kept in some distance from the tube by means of rings 11 applied to the tube. As in Fig. 1 the clamp bands 13' or the like serve to secure the ribbed sleeve 2, which in this case may be an external ribbed india rubber tube, fixedly and airtight to the tube 3'.

The compressed air or liquid can of course also be brought directly into the chamber 4', in which case conduit 5' could be omitted.

The filter cloth 1 is in that case only on one side open and is slipped over the tube 3' covered india rubber sleeve 2, whereas the fastening can furthermore take place with clamp bands.

As long as the india rubber sleeve 2 is blown up, it is not necessary that the filter cloth 1 lies tightly against the ribbed sleeve. Should it be desired india rubber rings 12 may be applied around the filter stocking, which expand when the india rubber sleeve is blown up. If then after the filter cloth 1 and the india rubber sleeve 2 have assumed the position $1^1$ and $2^1$ respectively consequence of the pressure through conduit 5', the filter cloth 1 will remain to lie against the india rubber sleeve 2 if the overpressure is released.

If a filter according to Fig. 4 is put into a tank with liquid to be filtered, a tubular filter cake will be formed around the sleeve when the india rubber sleeve 2 is blown up and the filtered liquid is sucked away through conduit 9'. If the material filtered off is sufficiently coherent it can be removed as a tube by taking the filter element out of the bath and releasing the pressure behind sleeve 2. In that case it is of importance that the filter stocking is removed from the inside of the tubular filter cake by the elastic rings 12.

It is sometimes advantageous to put a coarse meshed gauze cylinder or spiral around the filter before filtering, which then protects the cake externally when taking out the filter with the filter cake. After the filter 1 being taken off the liquid to be filtered, it can still be sucked some time through the conduit 9' in order to remove a further quantity of liquid from the filter cake. However, under such circumstances cracks in the filter cake may occur.

After the filter cake being removed from the filter cloth the cloth may be cleaned in a bath. It is advisable to stretch the cloth 1 by blowing up the india rubber sleeve 2, by means of which the pores are opened. Eventually compressed air or liquid may be admitted through conduit 9' which will clean the pores of the filter cloth.

The filter stockings to be used have a large working surface and can cheaply and easily be replaced. As is diagrammatically indicated in Fig. 6 the filter can also have a polygonal cross section in place of a circular one. In that case it is preferable to stiffen the angles with rods 20, by means of which irregular deformation is prevented.

As it is shown for the filters of Fig. 1 in Fig. 3 a number of filters according to Fig. 4 can be used in one tank. Preferably the tank 15 has then, as indicated in Fig. 7, a specially rounded shape, adapted to the shape of the filters. The filters can then easly be combined to a system, for example by attaching them to a fixed frame. Central press- and suck-mains may then be applied.

A special advantage of the filter according to the invention is the possibility to get a rather dry filter cake in the bath.

The most simple case is that a filter with circular cross section is used, placed in a cylindrical tank, so that the filter cake is everywhere at the same distance from the wall. The distance between the internal wall of the tank and the filter stocking must then be rather small. The space between the filter stocking and the wall of the tank is always kept filled when filtering with the liquid to be filtered. This space becomes more and more filled with solid material and finally this space contains only very little liquid. Then the india rubber surface is still further blown up, on account of which a pressure is executed on the filter cake, whereas in the chamber 8' the sucking is maintained. In this way a very dry filter cake is obtained. Preferably the flexible sleeve 2 is gradually enlarged therewith.

It is of great importance that the distance between the filter cloth and the wall of the tank is everywhere equally large, so that approximately the same amount of liquid enters each filter unit. If for example a filter with sixangular cross section is used, the liquid tank has preferably also a sixangular cross section. For the same reason the tank 15 in Fig. 7, in which a number of filters are applied, has a special shape, adapted to the external periphery of the system of filters.

A number of filters according to the invention may be combined and for example be arranged around a central column, which filters or groups of filters are then submerged alternately in tanks being correspondingly arranged around the central column.

In Fig. 8 it is indicated how a number of filters can be applied in a rectangular tank 19. In order to take care that the filter cloth is everywhere as much as possible at the same distance of a fixed wall, triangular filling pieces 14 with bulged sides are inserted into the tank.

If the filters are brought into totally closed tanks and pressure is exercised on the liquid to be filtered, it is not essential to have an under pressure in the chambers 8 and in the conduits 9. The liquid or the gas to be filtered is then pressed through the filter cloth.

The washing of the filter cake is very simple. After the filtering washing liquid can be brought into the tanks around the filter cakes, which is then sucked through the cakes. After washing the cake can then be dried by pressing and/or sucking.

Various changes of the shown embodiments are possible without departing from the invention. So the suction conduit 9, such as the main 5 (Figs. 1 and 3) can be arranged within the tube or the frame 3 and be connected through the wall of same with the chamber 8. The filters according to the invention have proved to be very efficient in practice and can be used a very long time without clogging. The new filters are especially suitable for separation of caseine and similar gelatinous matters from water.

The new filters can also be used to form tubes from in liquid suspended material, such as clay, kaolin and the like. After the solid material is deposited on the filter cloth, the tube formed of solid material can be removed from the filter, as described above. The tube can then be dried further and baked or hardened in another manner.

It can be of importance to apply a pulsatory pressure when filtering. If the pressure of the compressed air or liquid by which the india rubber surface 2 is stretched, is periodically slightly changed and, the pores in the filter cloth and also in the filter cake remain better open.

It is advantageous not immediately to remove the filter cake after forming, but to form a second cake over the first one after the sucking dry of the first one. In doing so time is saved, since it has been found that the filter resistance does not become too high. While the filter cake remains on the cloth, the india rubber sleeve can be stretched and released.

What I claim and desire to secure by Letters Patent is:

1. A filter for separating solids from a fluid comprising a hollow frame made of rigid material, a flexible deformable sleeve covering at least part of the outside walls of said frame, means for fastening said sleeve partly to said walls for defining a space between the walls of said frame and said sleeve, the walls of said frame including vents leading from the interior of said frame into the space defined between said frame and said sleeve, means for producing a varying pressure within the interior of said frame, projections provided on the outside of said sleeve, filter gauze made of elastic material placed over said sleeve, a conduit communicating with the space between said sleeve and said filter gauze for sucking in the fluid after removal of the solids and means for producing a suction in said suction conduit.

2. A filter for separating solids from a fluid comprising a hollow frame made of rigid material, a flexible deformable sleeve covering at least part of the outside walls of said frame, means for fastening said sleeve partly to said walls for defining a space between the walls of said frame and said sleeve, the walls of said frame including vents leading from the interior of said frame into the space defined between said frame and said sleeve, means for producing a varying pressure within the interior of said frame and in the space defined between the walls of said frame and said sleeve thus inflating said sleeve temporarily, ribs forming channels between them provided on the outside of said sleeve, filter gauze made of elastic material placed over said sleeve, a conduit communicating with said channels for sucking in the filtered fluid entering these channels and means for producing a suction in said suction conduit.

3. A filter for separating solids from a fluid comprising a tubular frame made of rigid material, arm plates attached to said frame, a flexible deformable sleeve covering at least part of the outside walls of said tubular frame and fastened to said arm plates at its ends for defining a space between the walls of said frame and said sleeve, a conduit discharging through the walls of said frame into the space defined between the walls of said frame and said sleeve, means for producing a varying pressure connected with said conduit, ribs forming channels between them provided on the outside of said sleeve, a hose of elastic filter gauze placed over said ribs, a conduit communicating with said channels for sucking in the filtered fluid entering said channels, said conduit being attached to said arm-plates and means for producing a suction in said suction conduit.

4. A filter according to claim 3, in which elastic rings for holding said filter gauze against said flexible deformable sleeve are spaced inwardly from the ends of said flexible deformable sleeve.

5. An apparatus for separating solids from a fluid comprising a tank for the fluid to be filtered, several filter units arranged in said tank, each unit comprising a hollow frame made of rigid material, an elastic deformable sleeve covering at least part of the outside walls of the said frame, means for fastening said sleeve partly to said walls for defining a space between the walls of said frame and said sleeve, the walls of said frame including vents leading from the interior of said frame into the space defined between said frame and said sleeve, means for producing a varying pressure within the interior of said frame, filter gauze made of elastic material placed over said sleeve, a conduit communicating with said space between said sleeve and said filter gauze for sucking in the fluid after removal of the solids and means for producing a suction in said suction conduit, and filling elements inserted in the spaces left between the filter units themselves and between the filter units and the side walls of said tank for having the liquid equidistant from each and every filter unit.

6. An apparatus for separating solids from a fluid comprising a tank for the fluid to be filtered, several filter units arranged in said tank, each unit comprising a hollow frame made of rigid material, arm-plates attached to said frame, a flexible deformable sleeve covering at least part of the outside walls of the said frame and fastened partly to the arm-plates of said frame for defining a space between the walls of said frame and said sleeve, the walls of said frame including vents leading from the interior of said frame into the space defined between said frame and said sleeve, means for producing a varying pressure within the interior of said frame, filter gauze made of elastic material placed over said sleeve, a conduit communicating with said space between said sleeve and said filter gauze for sucking in the fluid after removal of the solids and means for producing a suction in said suction conduit, the perimeter of the side walls of said tank shaped substantially parallel to the perimeter of the configuration formed by said filter units placed in said tank.

L. H. DE LANGEN.